US009278428B2

(12) United States Patent
Roden (10) Patent No.: US 9,278,428 B2
(45) Date of Patent: Mar. 8, 2016

(54) APPARATUS AND METHOD FOR RECLAIMING ABRASIVE BLASTING MATERIAL AND SCREENING DEVICE FOR SEPARATING ABRASIVE BLASTING MATERIAL

(71) Applicant: RECO ATLANTIC LLC, Baltimore, MD (US)

(72) Inventor: John Russell Roden, Bel Air, MD (US)

(73) Assignee: Reco Atlantic LLC, Baltimore, MD (US)

( * ) Notice: Subject to any disclaimer, the term of this patent is extended or adjusted under 35 U.S.C. 154(b) by 0 days.

(21) Appl. No.: 14/337,937

(22) Filed: Jul. 22, 2014

(65) Prior Publication Data

US 2014/0335768 A1 Nov. 13, 2014

Related U.S. Application Data

(62) Division of application No. 13/099,072, filed on May 2, 2011, now Pat. No. 8,783,468.

(60) Provisional application No. 61/480,129, filed on Apr. 28, 2011.

(51) Int. Cl.
*B24C 9/00* (2006.01)
*B07B 1/10* (2006.01)
(Continued)

(52) U.S. Cl.
CPC . *B24C 9/006* (2013.01); *B07B 1/10* (2013.01); *B07B 9/00* (2013.01); *B08B 7/02* (2013.01)

(58) Field of Classification Search
CPC ................ B07B 1/10; B07B 1/00; B07B 4/00
USPC ......... 209/233, 235, 307, 420, 421; 37/142.5; 451/39
See application file for complete search history.

(56) References Cited

U.S. PATENT DOCUMENTS

| | | | | |
|---|---|---|---|---|
| 2,276,099 | A | * | 3/1942 | Scherfel ................ B65G 15/54 198/820 |
| 3,193,436 | A | * | 7/1965 | Kalwaites ..................... 428/113 |
| 4,146,483 | A | * | 3/1979 | Lee ........................... B03B 5/08 209/272 |

(Continued)

FOREIGN PATENT DOCUMENTS

DE 4303868 A1 9/1994
DE 102007055759 A1 6/2009
(Continued)

*Primary Examiner* — Terrell Matthews
(74) *Attorney, Agent, or Firm* — Berenato & White, LLC (57) ABSTRACT

An apparatus for reclaiming abrasive blasting material comprises a prime mover, a vacuum pump and a separator unit for separating the abrasive blasting material in the contaminated abrasive blasting material from contaminants. The vacuum pick-up draws the contaminated abrasive blasting material. The separator unit includes a screening device for separating and reclaiming the abrasive blasting material. The screening device comprises a support member having a longitudinal axis and a transverse axis, and an endless flexible screen belt mounted to the support member so as to be movable along an endless closed loop in the direction of the longitudinal axis. The screen belt has a plurality of openings being sized to allow particles of the abrasive blasting material of a desired size to fall therethrough by gravity and to prevent the contaminants larger than the abrasive blasting material from falling therethrough.

10 Claims, 12 Drawing Sheets

(51) Int. Cl.
*B07B 9/00* (2006.01)
*B08B 7/02* (2006.01)

(56) References Cited

U.S. PATENT DOCUMENTS

| | | |
|---|---|---|
| 4,827,678 A | 5/1989 | MacMillan et al. |
| 5,097,610 A | 3/1992 | Bishop |
| 5,212,911 A | 5/1993 | Benson |
| 5,817,398 A * | 10/1998 | Hollander ................ 428/141 |
| 8,783,468 B2 * | 7/2014 | Roden .................. B07B 1/10 |
| | | 209/233 |
| 2002/0189978 A1 | 12/2002 | Freeman |
| 2006/0180507 A1 * | 8/2006 | DeHart et al. .............. 209/311 |

FOREIGN PATENT DOCUMENTS

| | | |
|---|---|---|
| GB | 2275878 A | 9/1994 |
| WO | 97/41972 A1 | 11/1997 |

* cited by examiner

APPARATUS AND METHOD FOR RECLAIMING ABRASIVE BLASTING MATERIAL AND SCREENING DEVICE FOR SEPARATING ABRASIVE BLASTING MATERIAL

CROSS-REFERENCE TO RELATED APPLICATION

This application is a division of U.S. application Ser. No. 13/099,072 filed May 2, 2011, now U.S. Pat. No. 8,783,468, which claims benefit of U.S. Provisional patent application Ser. No. 61/480,129 filed Apr. 28, 2011, the disclosures of which are incorporated herein by reference and to which priority is claimed.

FIELD OF THE INVENTION

This present invention relates to devices and methods for cleaning, separating and reclaiming spent abrasive blasting material that have been employed during an abrasive blasting process in general and, more particularly, to a screening device for separating and recovering spent abrasive blasting material for reuse.

BACKGROUND OF THE INVENTION

Cleaning large metal surfaces with abrasive blasting material (abrasive grit material) by abrasive blasting (or pressure blasting), such as by sandblasting, bead blasting, etc., is well known in the related art. The most commonly used type of abrasive blasting media currently used is silica sand, fine glass beads, steel shot, steel grit, stainless steel shot, cut wire, grit or similar sized pellets, etc. It is possible to repeatedly use the same abrasive blasting material (or media) several times, if the abrasive blasting material is properly cleaned between each use.

One consequence of the abrasive blasting process on the abrasive blasting materials resulting from high velocity impacting on steel surfaces being cleaned causes them to abrade and generate contaminants such as dirt, paint, mill scale, and rust from the treated surface. At the same time a certain amount of fractured, fine abrasive particles (dust) is also produced.

Various types of devices for cleaning and reclaiming spent abrasive blasting media are available in the related art. Typically, in such a device, the used abrasive blasting media is vacuumed up and carried in an airstream to a cleaning and separating device. Lightweight contaminants are removed by air-washing, while large particulate contaminated material is separated by a separating device.

While known devices for cleaning and reclaiming spent abrasive blasting media have proven to be acceptable for various abrasive blasting media cleaning and reclaiming applications, such devices are nevertheless susceptible to improvements that may enhance their performance, applicability, cost and attractiveness. With this in mind, a need exists to develop an improved screening device and method for separating and recovering spent abrasive blasting material for reuse that advances the art.

SUMMARY OF THE INVENTION

A first aspect of the invention provides a screening device for separating and reclaiming abrasive blasting material from contaminants. The screening device comprises a support member having a longitudinal axis and a transverse axis, and an endless flexible screen belt mounted to the support member so as to be movable along an endless closed loop in the direction of the longitudinal axis. The screen belt has a plurality of openings being sized so as to allow particles of the abrasive blasting material of a desired size to fall therethrough by gravity and to prevent contaminants larger than the abrasive blasting material from falling therethrough by gravity.

According to a second aspect of the invention, an apparatus is provided for reclaiming abrasive blasting material. The apparatus features a prime mover, vacuum pump powered by the prime mover, and a separator unit for receiving contaminated abrasive blasting material via a vacuum pick-up and separating the abrasive blasting material in the contaminated abrasive blasting material from contaminants larger than the abrasive blasting material. The vacuum pick-up fluidly is connected to the vacuum pump to draw the contaminated abrasive blasting material into the vacuum pick-up. The separator unit includes a screening device for separating and reclaiming the abrasive blasting material. The screening device comprises a support member having a longitudinal axis and a transverse axis, and an endless flexible screen belt mounted to the support member so as to be movable along an endless closed loop in the direction of the longitudinal axis. The screen belt has a plurality of openings sized so as to allow particles of the abrasive blasting material of a desired size to fall therethrough by gravity and to prevent the contaminants larger than the abrasive blasting material from falling therethrough by gravity.

Other aspects of the invention, including apparatus, systems, methods, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS AND EXEMPLARY METHODS

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one".

Figure 1:
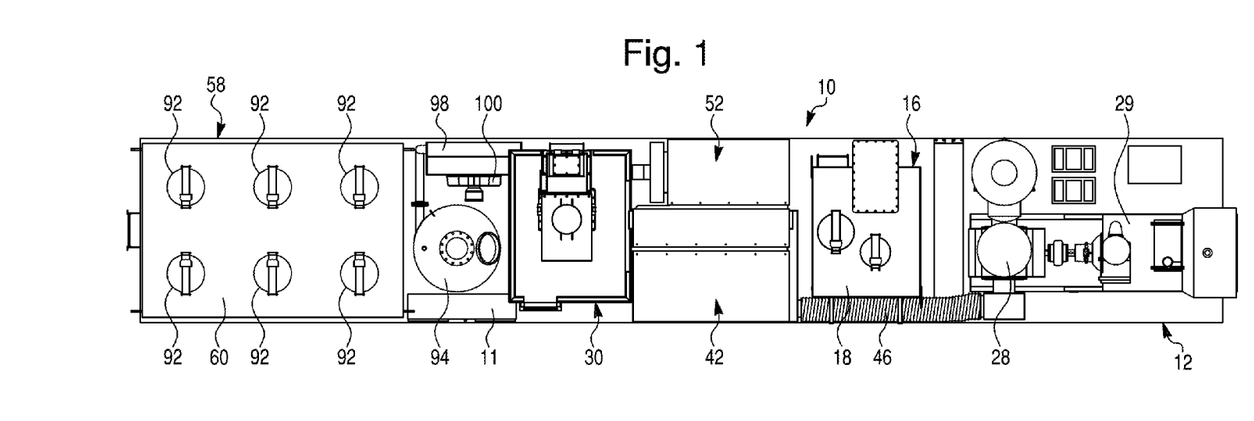
FIG. 1 is a side elevational view of a mobile apparatus for separation and recovery of spent abrasive blasting material according to an exemplary embodiment of the invention.
Figure 2:
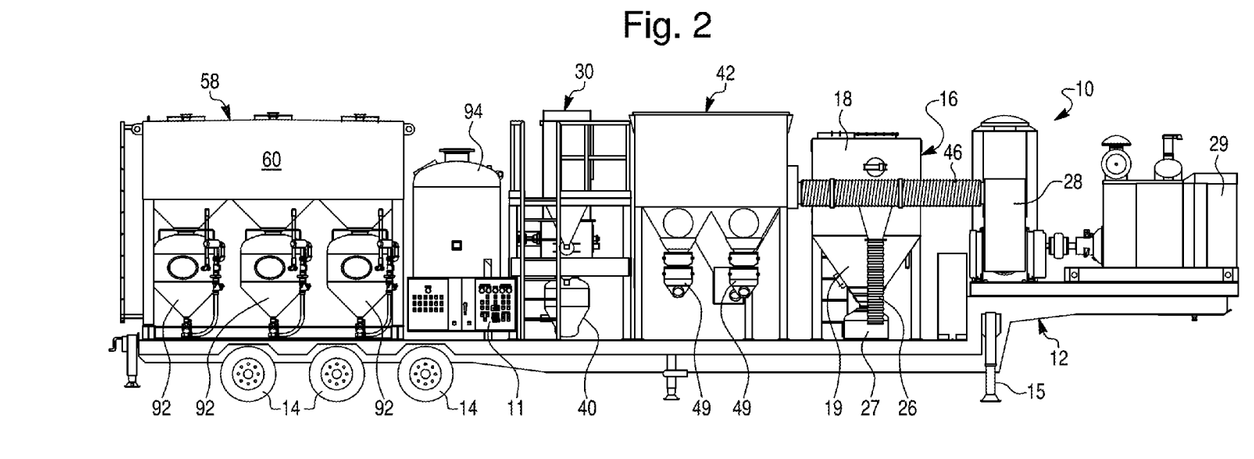
FIG. 2 is a top plan view of the mobile apparatus of FIG. 1.
Figure 3:
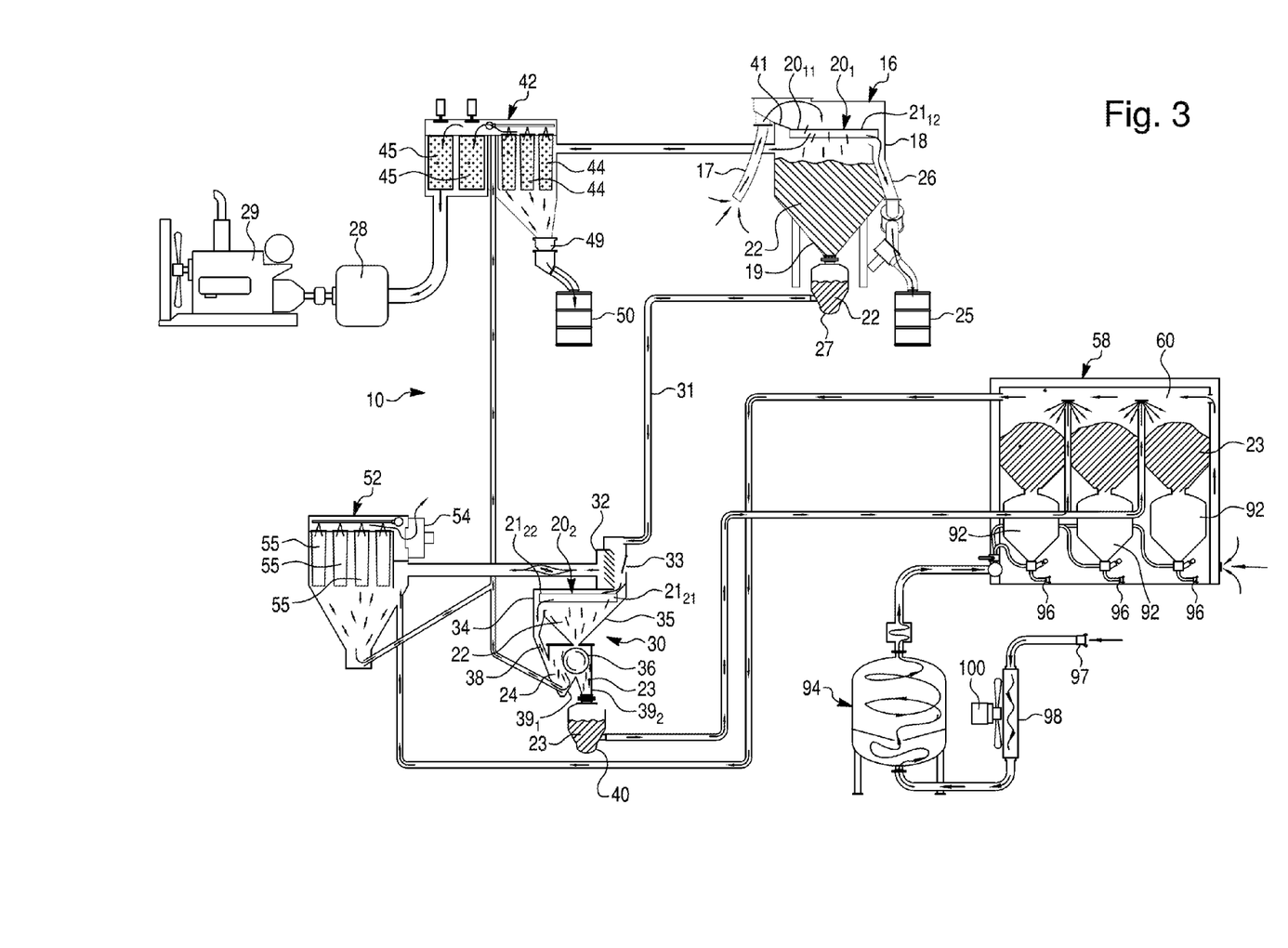
FIG. 3 is a schematic view of a process of cleaning, separating and reclaiming spent abrasive blasting material employing the mobile apparatus of FIGS. 1 and 2.

FIGS. 1-3 of the drawings illustrate an apparatus and a process for separation and recovery (reclaiming, recycling) of used (or spent) abrasive blasting material (media) according to an exemplary embodiment of the present invention indicated generally by reference numeral 10. The apparatus 10 is an abrasive blasting material recycling system that includes vacuum recovery, classification, and air blasting units. The apparatus 10 has four major subsystems: vacuum, classification, compressed air dryer, and blasting, and a control panel 11. According to the exemplary embodiment of the present invention, the apparatus 10 is a mobile apparatus in the form of a self-contained vehicle 12, such as a trailer, having one or more wheels and axle assemblies 14, one or more telescopically extensible trailer stabilizer arms 15 that may extend from the trailer 12 and can be deployed therefrom to support and stabilize the trailer 12 during the operation of the mobile apparatus 10. In other words, the components of the apparatus 10 according to the exemplary embodiment of the present invention are mounted on a single trailer. Alternatively, the components of the mobile apparatus 10 can be mounted on a skid or multiple skids and trailers. Further alternatively, the apparatus 10 can be stationary, i.e. permanently mounted.

The apparatus 10 according to the exemplary embodiment of the present invention comprises a vacuum recovery unit 16 mounted on the trailer 12. The vacuum recovery unit 16 includes a vacuum storage hopper (bin) 18 for receiving and storing (i.e., recovery of) spent or used, dirty abrasive blasting material, such as abrasive grit. The spent dirty (i.e., contaminated) abrasive blasting material, generally denoted with the reference numeral 22, is composed of the abrasive blasting material (media) 23 and various contaminants 24 including large contaminants (large trash items), paint chips and dust. It is desirable to remove the contaminants 24 from the contaminated abrasive blasting material 22 and recover clean abrasive blasting material 23 for reuse, as best shown in FIG. 3.

Figure 4:
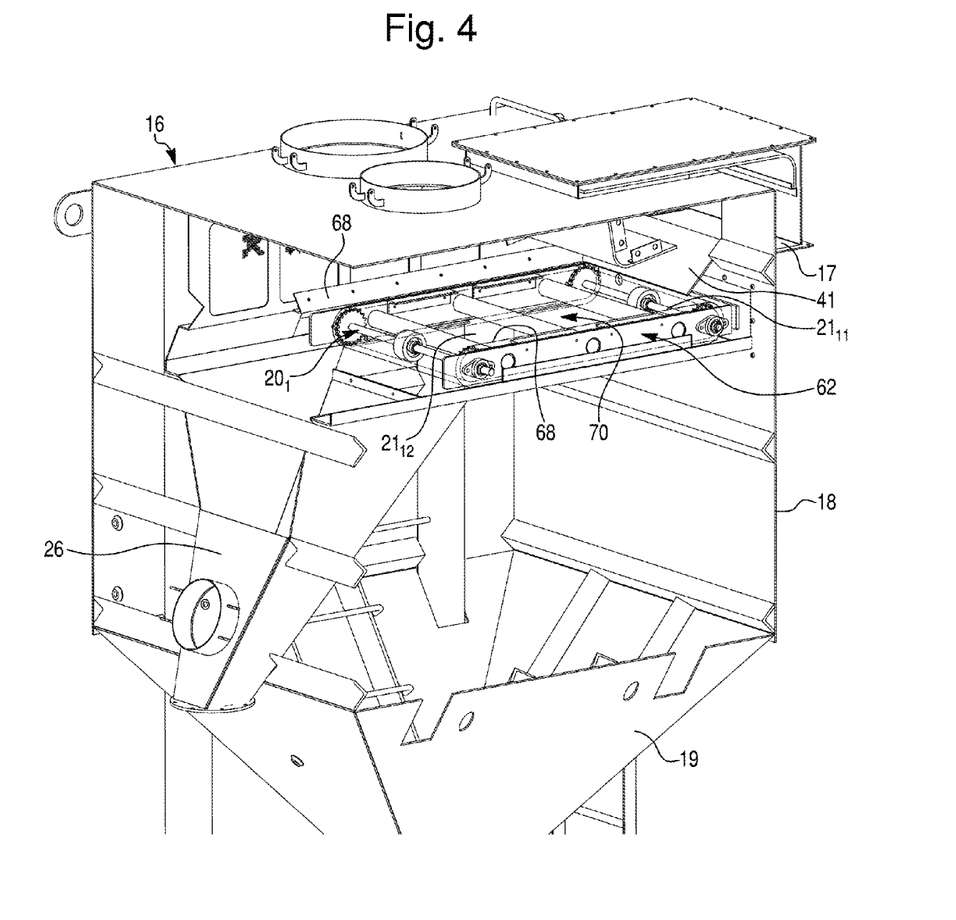
FIG. 4 is a partial enlarged perspective view of a separator unit of the mobile apparatus of FIGS. 1 and 2.

The contaminated abrasive blasting material 22 is initially delivered into the vacuum recovery unit 16 via a vacuum pick-up 17. The vacuum pick-up 17 is in fluid communication with a vacuum pump 28 selectively powered by a prime mover 29, i.e. a machine that transforms energy from thermal, electrical or pressure energy to mechanical energy. In the exemplary embodiment of the present invention, the prime mover 29 is in the form of an internal combustion engine, such as a diesel engine. It will be appreciated that any other type of prime mover, such as an electric motor, is within the scope of the present invention. Both the vacuum pump 28 and the diesel engine 29 are mounted on the trailer 12. As illustrated in FIGS. 3 and 4, the vacuum recovery unit 16 further includes a first (or primary) screening device $20_1$ disposed in an upper portion of the vacuum storage hopper 18. The first screening device $20_1$ is provided with a screen having a plurality of holes, known as "mesh," The primary screening device $20_1$ is provided with the screen having oversized screen holes for screening (separating) and reclaiming the contaminated abrasive blasting material from large contaminants (or large trash items).

The contaminated abrasive blasting material from the vacuum pick-up 17 is directed onto a front end $21_{11}$ of the primary screening device $20_1$, as shown in FIG, 3 of the drawings, through a feeding ramp 41 (shown in FIGS. 3 and 4). The recovered contaminated abrasive blasting material falls out of the air stream into the oversize screen of the primary screening device $20_1$. The primary screening device $20_1$ delivers the contaminated abrasive blasting material from the front end $21_{11}$ to a rear end $21_{12}$ thereof. The primary screening device $20_1$ screens the contaminated abrasive blasting material 22 by size while transporting the contaminated abrasive blasting material 22 from the front end $21_{11}$ to the read end $21_{12}$ thereof so as to allow only a desired size (including the particles of the abrasive blasting material 23) to fall therethrough by gravity and to prevent contaminants larger than the desired size from falling therethrough by gravity. The contaminated abrasive blasting material 22 (in this case, the mixture of the abrasive blasting material and the remaining contaminates, separated by the primary screening device $20_1$ from the large contaminants) falls by gravity through the primary screening device $20_1$ into a conical lower portion 19 of the vacuum storage hopper 18. The large contaminants are deposited into a large trash item container 25 from the rear end $21_{12}$ of the primary screening device $20_1$ through a large item outlet 26. The contaminated abrasive blasting material 22 (with the remaining contaminates but without the large contaminants) is then deposited into a dirty grit transporter (container) 27.

The dirty (dusty) air is removed from the vacuum storage hopper 18 to a vacuum dust collector 42 where the air is filtered by primary filters 44 and secondary filters 45, then passes through a vacuum tube 46 to the vacuum pump 28, where it is discharged into the atmosphere. The dust removed from the dirty air is deposited into a dust container 50 through a double dump dust discharge 49, shown in FIG. 3.

The apparatus 10 further comprises a classifier unit 30 mounted on the trailer 12 and in fluid communication with the vacuum recovery unit 16. The classifier unit 30 includes a dust separator 32 with an air wash intake 33, a second (or secondary) screening device $20_2$ disposed in an upper portion of classifier bin 34, and a magnetic drum separator 36 disposed downstream of the secondary screening device $20_2$. The classifier bin 34 has a funnelled tower portion 35 with an outlet opening facing the magnetic separator 36. The magnetic separator 36 is disposed in a separator bin 38 located beneath (downstream the classifier bin 34. The separator bin 38 includes a contaminant section $39_1$ and an uncontaminated section $39_2$.

The second screening device $20_2$, like the first screening device $20_1$, is provided with a screen having a plurality of holes, known as "mesh." The second screening device $20_2$ screens (separating) and reclaims the contaminated abrasive blasting material 22 from the remaining contaminants 24. It should be noted that the size of the screen mesh of the secondary screening device $20_2$ is smaller than the size of the screen mesh of the primary screening device $20_1$. Otherwise, the first screening device $20_1$ and the second screening device $20_2$ are substantially structurally identical.

After screening through the primary screening device $20_1$, the recovered. contaminated abrasive blasting material 22 from the dirty grit transporter 27 is transported to the classifier unit 30 where it is de-dusted in the air wash of the dust separator 32, screened again in the secondary screening device $20_2$, passes over the magnetic drum separator 36, and is then transferred to a recycled grit storage hopper 40.

Specifically, the contaminated abrasive blasting material 22 from the dirty grit transporter 27 is fed onto a front end $21_{21}$ of the secondary screening device $20_2$, as shown in FIG. 3 of the drawings, through a delivery passage 31. The secondary screening device $20_2$ delivers the contaminated abrasive blasting material 22 from the front end $21_{21}$ to a rear end $21_{22}$ thereof. The secondary screening device $20_2$ screens the contaminated abrasive blasting material 22 by size while transporting the contaminated abrasive blasting material 22 from the front end $21_{21}$ to the read end $21_{12}$ thereof so as to allow material of only a desired size (such as the particles of the abrasive blasting material 23) to fail therethrough by gravity and to prevent contaminants larger than the desired size from falling therethrough.

The contaminated abrasive blasting material 22 (in this case, the mixture of the abrasive blasting material and the remaining contaminates, separated by the secondary screening device $20_2$ from the medium-size contaminants) falls by gravity through the secondary screening device $20_2$ into the funnel-shaped tower portion 35 of the classifier bin 34. The medium-size contaminants, such as paint chips, are transported to and deposited into the contaminant section $39_1$ of the separator bin 38. The contaminated abrasive blasting material 22 (with the remaining contaminates but without the medium-size contaminants) is then deposited into the lower portion 35 of the classifier bin 34.

The magnetic separator 36 comprises a drum at least a portion of which is magnetized. Consequently, as the contaminated abrasive blasting material 22 is supplied to the magnetic separator 35, the magnetic contaminants 24 are separated therefrom and conveyed to the contaminant section $39_1$ of the magnetic separator bin 38, while the reclaimed (recycled), clean abrasive blasting material 23 is fed to the uncontaminated section $39_2$ of the magnetic separator bin 38. The recycled abrasive blasting material 23 (substantially without the contaminants, i,e., with negligible amount of contaminants, such as dust) is then deposited into the recycled grit storage hopper 40.

The dirty (dusty) air from the dust separator 32 is removed to a recycle collector 52 (using vacuum created by a recycle blower 54), where the air is filtered by filters 55, then passes to the vacuum dust collector 42 where the air is filtered, then discharged into the atmosphere. The dirty (dusty) air from the contaminant section $39_1$ of the magnetic separator bin 38 is removed from the contaminant section $39_1$ of the magnetic separator bin 38 to the vacuum dust collector 42 where the air is filtered by the primary filters 44 and secondary filters 45, then passes to the vacuum pump 28 where it is discharged into the atmosphere. The dust removed from the dirty air is deposited into a dust container 50, as best shown in FIG. 3.

The recycled (reclaimed) abrasive blasting material 23 is then transported to a blast pot unit 58 and deposited into a recycled grit storage hopper 60. The dirty (dusty) air from the recycled grit storage hopper 60 is removed to the recycle collector 52 where the air is filtered, then passes to the vacuum dust collector 42 where the air is filtered again, then discharged into the atmosphere. The blast pot unit 58 further includes a plurality of blast pots 92. The recycled (reclaimed) abrasive blasting material 23 stored in the recycled grit storage hopper 60 is loaded in to the blast pots 92 as needed. Compressed air from an external air compressor(s) passes through a compressed air dryer 94 where it is prepared for use in the blast pot unit 58 to propel the recycled abrasive blasting material 23 through hoses 96, ere it is directed at steel and other substrates for corrosion, paint, and contaminate removal. The compressed air dryer 94 is connected to the external air compressor(s) via a compressed air connector 97. Before entering the compressed air dryer 94, the compressed air passes through a compressed air intercooler 98, which is provided with a cooling fan unit 100.

After being blasted, the spent abrasive blasting material 22 is vacuumed back into the vacuum recovery unit 16 to start the recycling process again.

As noted above, the first (primary) screening device $20_1$ and the second (secondary) screening device $20_2$ are substantially structurally identical and differ primarily physical size and mesh size of the screens. In view of the structural similarities of the first and second screening device $20_1$ and $20_2$, and in the interest of simplicity, the following discussion will use a reference numeral without a subscript number to designate both of the screening devices. For example, the reference numeral 20 will be used when generically referring to the screening devices $20_1$ and $20_2$ rather than reciting both reference numerals. Accordingly, because the screening devices $20_1$ and $20_2$ are substantially identical in design, only one of the screening devices $20_1$ and $20_2$ will be described in detail hereinbelow. As best illustrated in detail in FIGS. 6A-9, the screening device 20 comprises a support member 62 having a longitudinal axis X-X and a transverse axis Y-Y perpendicular to the longitudinal axis X-X, an endless flexible screen belt 70 mounted to the supporting member 62 so as to be movable about an endless closed loop in the direction of the longitudinal axis X-X defining the travel direction of the screen belt 70, and a drive mechanism mounted to the support member 62 for driving the screen belt 70 along the endless closed loop.

In the exemplary embodiment of FIGS. 5-9, the support member 62 is in the form of a frame including two opposite longitudinally extending (i.e., in the direction of the longitudinal axis X-X) side plates 63a and 63b, interconnected by a transverse end plate 63c extending in the direction of the transverse axis Y-Y. The frame 62 further comprises one or more bars 64 transversely extending between the longitudinal side plates 63a and 63b, It will be appreciated that the support member 62 may be of any other appropriate form and configuration so as to movably support the endless flexible screen belt 70. The support member 62 further comprises opposite mounting members 65 provided for securing the screening device 20 within the vacuum storage hopper 18, as best shown in FIGS. 1-4.

The endless flexible screen belt 70 is in the form of an endless flexible wire mesh belt that includes a plurality of substantially identical, single-piece, interconnected spiral wire members (wire coils) 72 each extending in the direction of the transverse axis Y-Y and arranged parallel to each other. Each of the spiral wire members 72 includes a plurality of spiral (helical) windings 73. According to the exemplary embodiment of the present invention shown in FIG. 8, the spiral windings 73 of each of the wire members 72 have substantially oval cross-section extending in the direction of the longitudinal axis X-X, Each of the wire members 72 includes a plurality of opposite, substantially semi-circular end portions 73e facing each other. As further illustrated in FIGS. 8-12, the end portions 73e of the adjacent spiral wire members 72 overlap in the direction of the longitudinal axis X-X and are spaced from each other in the direction of the transverse axis Y-Y. Furthermore, the spiral wire members 72 are preferably made of carbon steel of round cross-section. It should be noted that any other appropriate material, such as strong polyester, or cross-section are within the scope of the present invention.

The wire mesh belt 70 further comprises a plurality of connecting rod members 74 extending in the direction of the transverse axis Y-Y and spaced from one another in the direction of the longitudinal axis X-X so as o be arranged parallel to each other. The connecting rod members 74 are preferably made of low carbon steel and have a nominal diameter of 0.228 inches. As illustrated in detail in FIGS. 6A-6B and 8-12, each of the connecting rod members 74 extends through two adjacent spiral wire members 72 so as to interconnect the end portions 73e of the two adjacent spiral wire members 72. In the exemplary embodiment of the present invention the adjacent wire members 72 are spirally (helically) wound in opposite directions. The wire members 72 are preferably made from 12 gauge low carbon steel, and have a nominal diameter of 0.105 inches. Furthermore, the screen belt 70 defines a plurality of openings 73' sized to allow particles of the abrasive blasting material of a desired size to fall therethrough by gravity and to prevent the contaminants larger than the abrasive blasting material from falling therethrough by gravity. The openings 73' are preferably 0.145 inches wide by about 0.35 inches long, although they may be larger or smaller depending upon the abrasive being used. It should be understood that open spaces 76 formed in the spiral wire members 72 between the spaced connecting rod members 74 define the screen openings of the screen belt 70. Those skilled in the art will realize that by manipulating the pitch of the spiral wire members 72, the size of the screen openings 76 (the mesh) can be adjusted as required depending on the abrasive blasting material employed. The term "pitch" is commonly defined in the art as the distance from a center of one spiral winding 73 to the center of the adjacent spiral winding 73 of the same spiral wire ember 72.

The drive mechanism of the screening device 20 comprises a pair of separate, synchronously driven endless power transmitting members in the form of link drive chains 78 according to the exemplary embodiment of the present invention. The drive chains 78 are disposed on transversely opposite sides of the screen belt 70 so as to extend in parallel spaced relationship along opposite transverse edges of the screen belt 70 in the direction of the longitudinal axis X-X, and interconnected by the connecting rod members 74, a pair of separate, synchronously driven, coaxial drive sprockets 80 and a pair of separate, synchronously driven, coaxial driven sprockets 82 each drivingly engaging one of the link drive chains 78. In other words, each of the synchronously driven endless driving chains 12 runs over and between two pairs of the coaxial drive and driven sprockets 80, 82. As illustrated in detail in FIGS. 6A, 9 and 10, the link drive chains 78 are fixed or attached to opposite distal ends of the connecting rod members 74 of the screen belt 70 by any appropriate means known in the art so that the movement of the link drive chains 78 in the direction of the longitudinal axis X-X imparts the corresponding movement of the screen belt 70 in the same direction. Moreover, each of the drive sprockets 80 is rotatably mounted to the support member 62 though a drive shaft 81, while each of the driven sprockets 82 is rotatably mounted to the support member 62 though a driven shaft 83.

As further illustrated in detail in FIGS. 6A and 7-9, the drive mechanism of the screening device 20 also comprises a drive motor 84 provided for rotating the drive shaft 81 through a gearbox 85. In other words, the endless link drive chains 78 are synchronously driven in the direction of the longitudinal axis X-X by the motor 84 through the drive sprockets 80. Moreover, the screen belt 70 is rotatably mounted to the support, member 62 through the drive and driven sprockets 80, 82 of the drive mechanism and is driven in the direction of the longitudinal axis X-X by the motor 84 through the drive sprockets 80 and the endless link drive chains 78. According to the exemplary embodiment of the present invention, the motor 84 is an electric motor. Alternatively, any appropriate motor, such as a hydraulic motor or pneumatic motor, can be used with or without the gearbox.

In operation, the contaminated abrasive blasting material from the vacuum pick-up 17 is directed into the screening device 20, as shown in FIG. 3 of the drawings, through a feeding ramp 21 that delivers the contaminated abrasive blasting material to a front end $70_f$ of the screen belt 70 of the screening device 20. As the screen belt 70 is driven along an endless closed loop in the direction of the longitudinal axis X-X by the drive motor 84, the contaminated abrasive blasting material deposited to the screen belt 70 travels in the travel direction T toward a rear end $70_r$ thereof. During the travel from the front end $70f$ toward the rear end $70_r$ of the screen belt 70, mixture 22 of the particles of the abrasive blasting material and the remaining contaminates of a desired size fall through the screen openings 76 in the screen belt 70 by gravity into the funnel-shaped lower portion 19 of the vacuum storage hopper 18, while large contaminants, separated from the mixture 22, are deposited into the large trash item container 25 through the large item outlet 26. The screening device 20 is further provided with skirts 68 inclined toward the screen belt 70 and extending in parallel spaced relationship along opposite transverse edges there f in the direction of the longitudinal axis X-X in order to keep the contaminated abrasive blasting material 22 on the moving screen belt 70.

Figure 5:
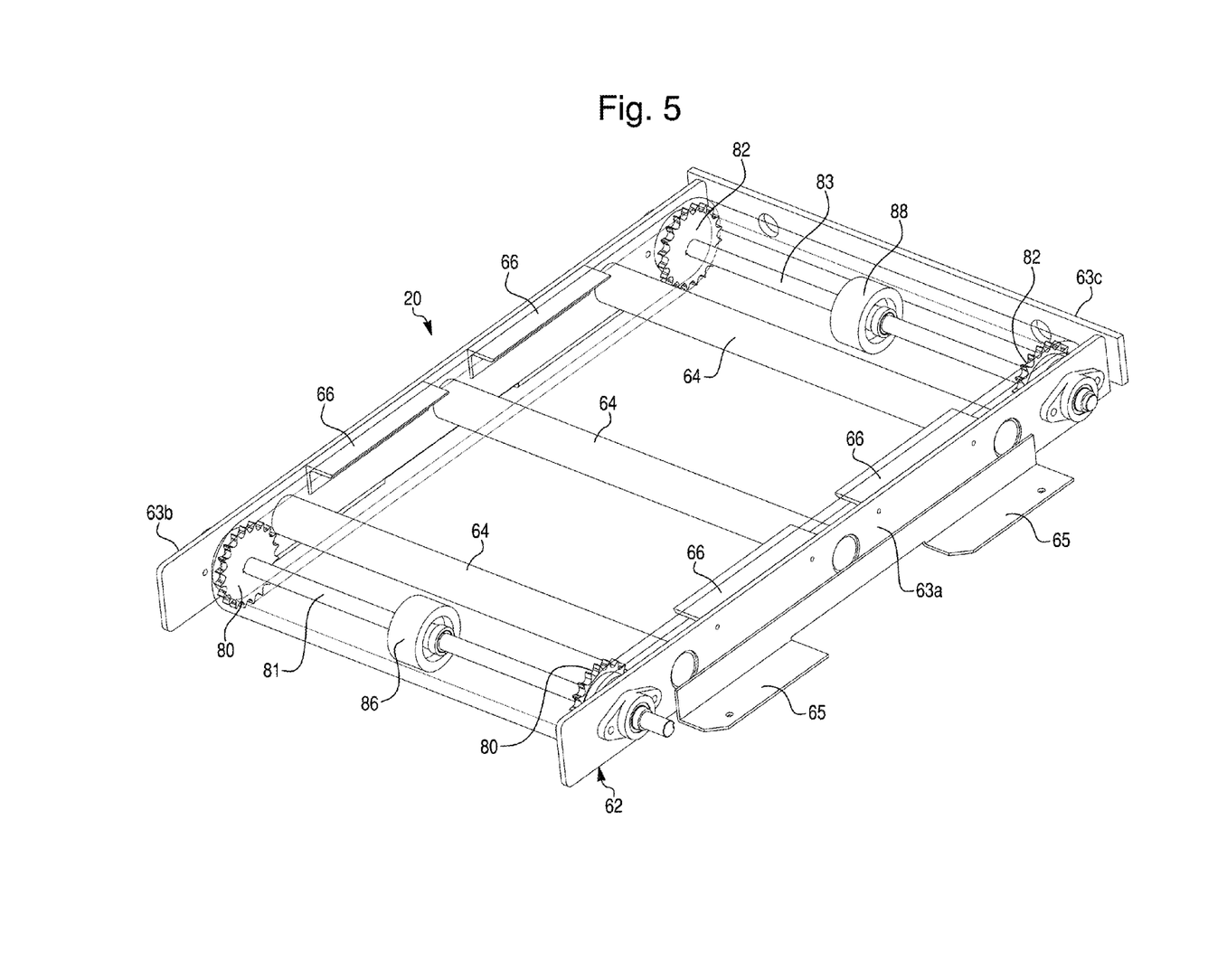
FIG. 5 is a partial enlarged perspective view of a screening device of the mobile apparatus of FIGS. 1 and 2.
Figure 6A:
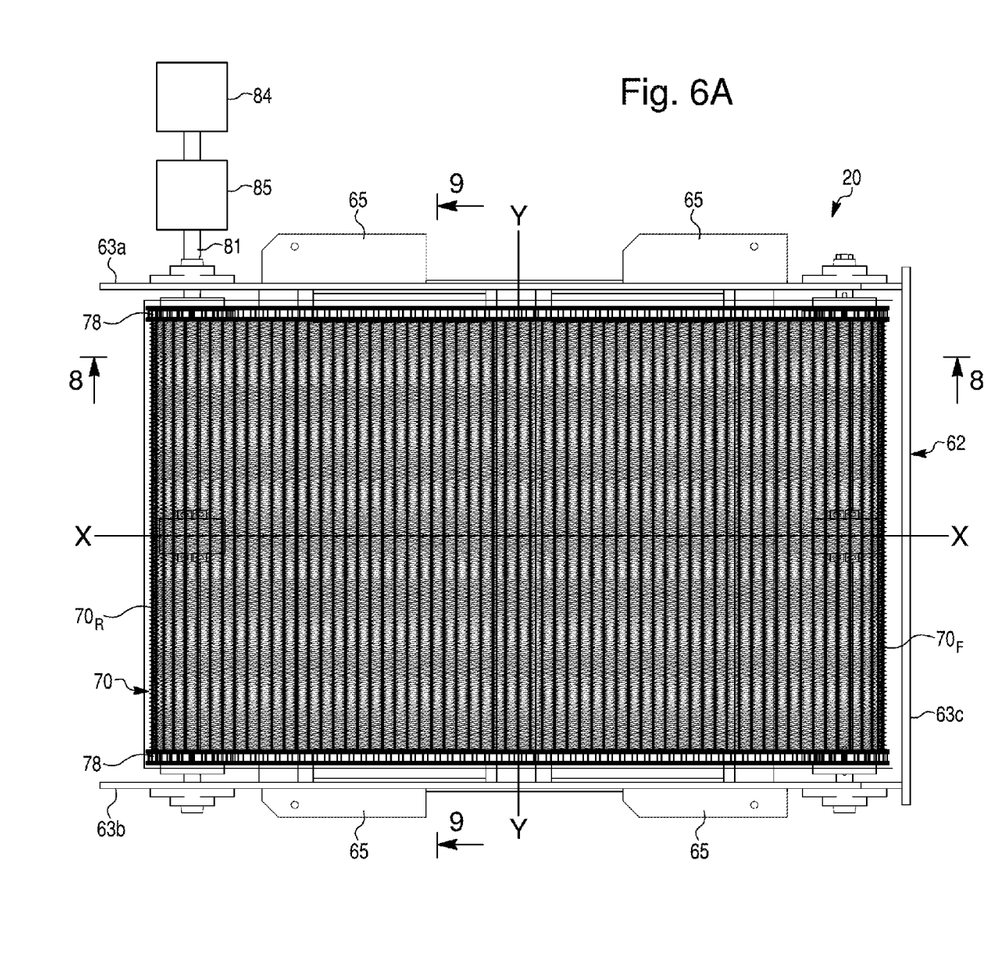
FIG. 6A is a top plan view of the screening device of the mobile apparatus of FIGS. 1 and 2.
Figure 6B:
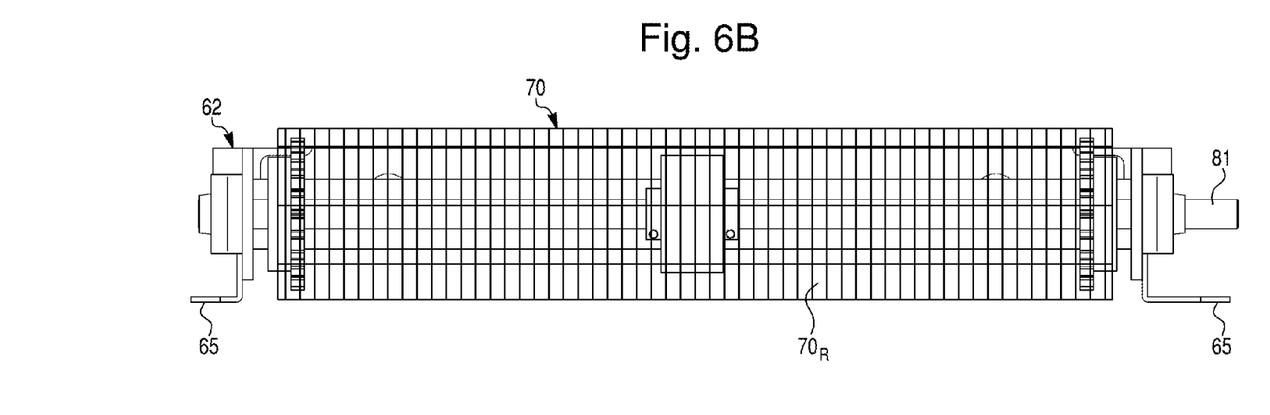
FIG. 6B is a front elevational view of the screening device of the mobile apparatus of FIGS. 1 and 2.
Figure 6C:
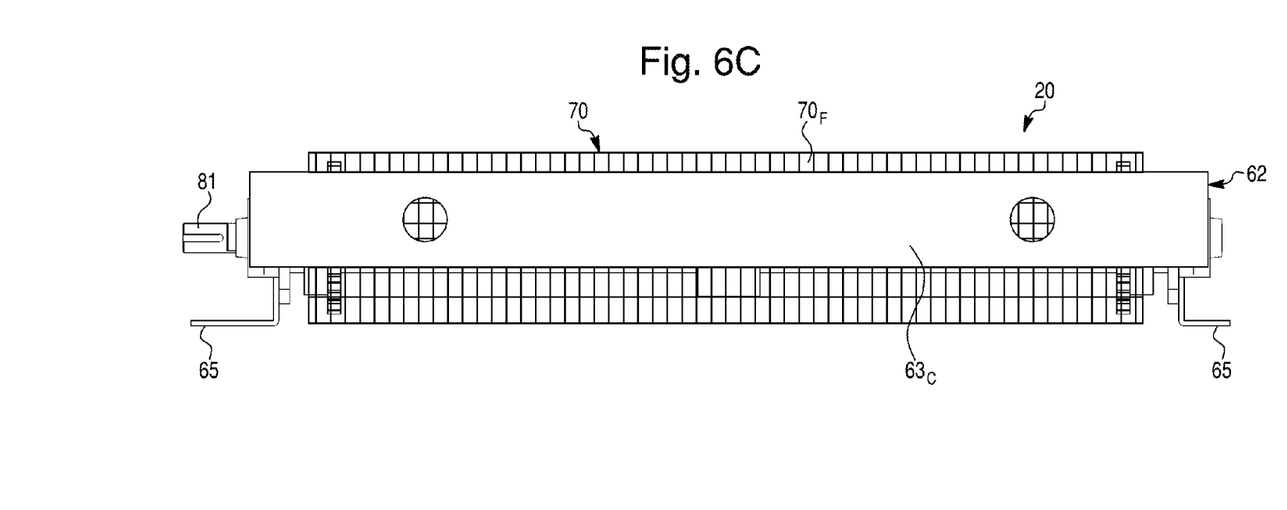
FIG. 6C is a rear elevational view of the screening device of the mobile apparatus of FIGS. 1 and 2.
Figure 7:
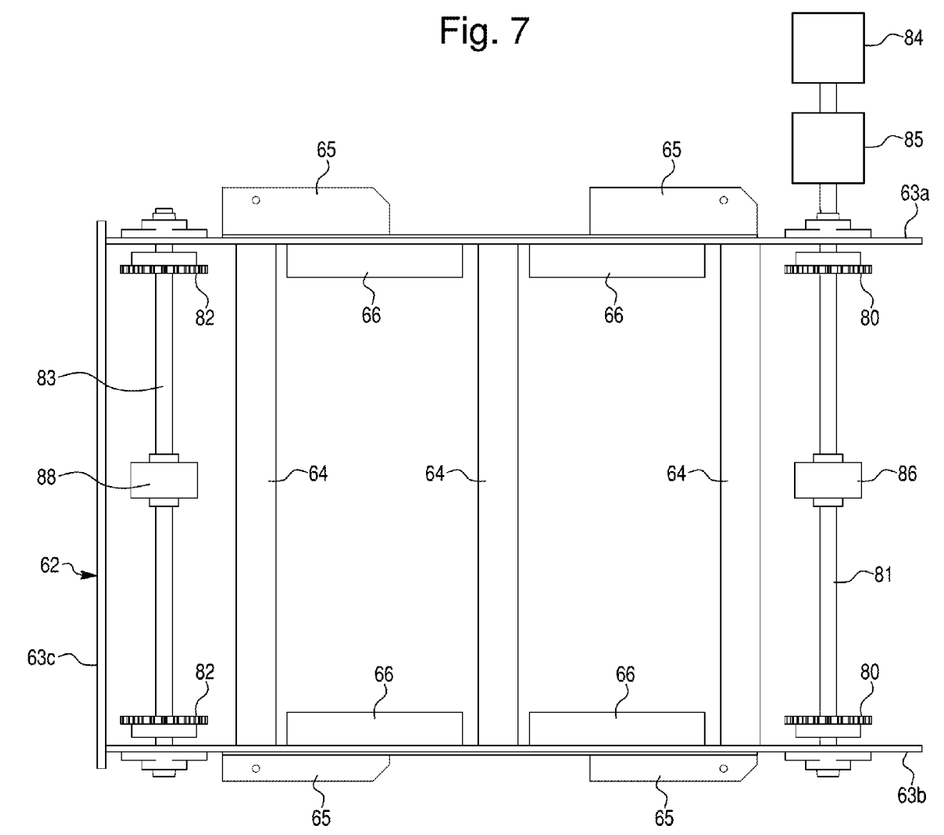
FIG. 7 is a bottom plan view of the screening device according to the exemplary embodiment of the invention showing a support member and a drive mechanism mounted to the support member.
Figure 8:
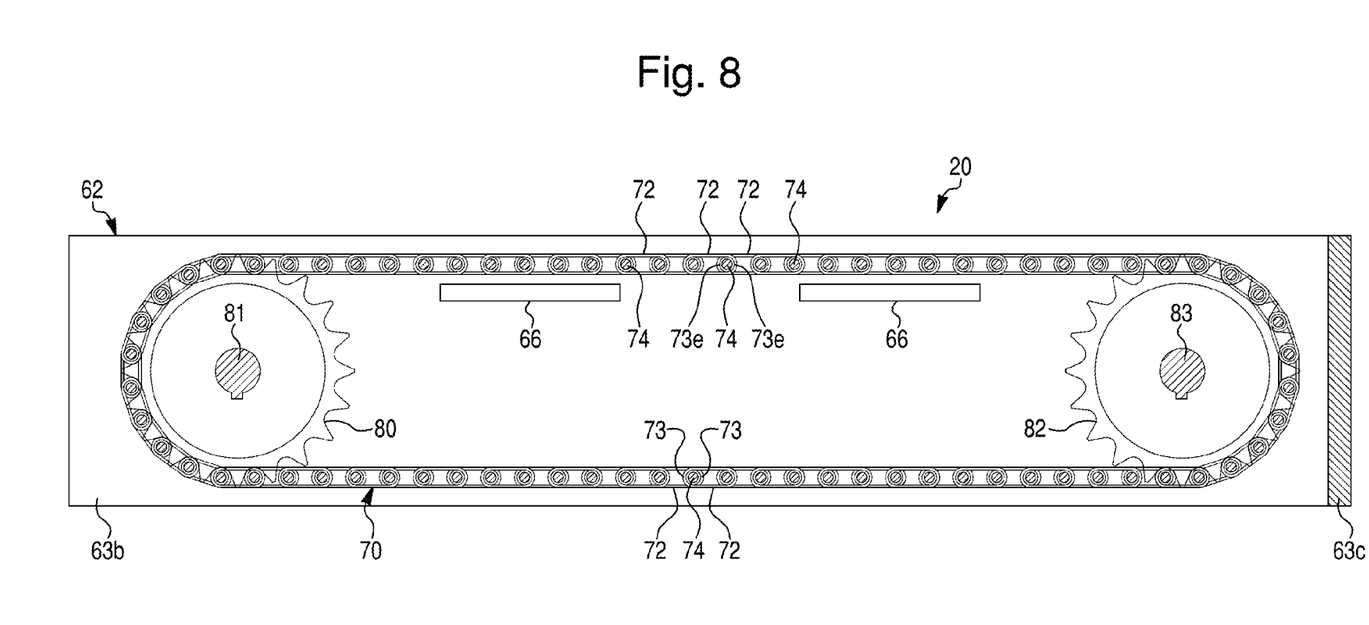
FIG. 8 is a vertical cross-sectional view of the screening device according to the exemplary embodiment of the present invention taken along the lines 8-8 in FIG. 6A.
Figure 9:
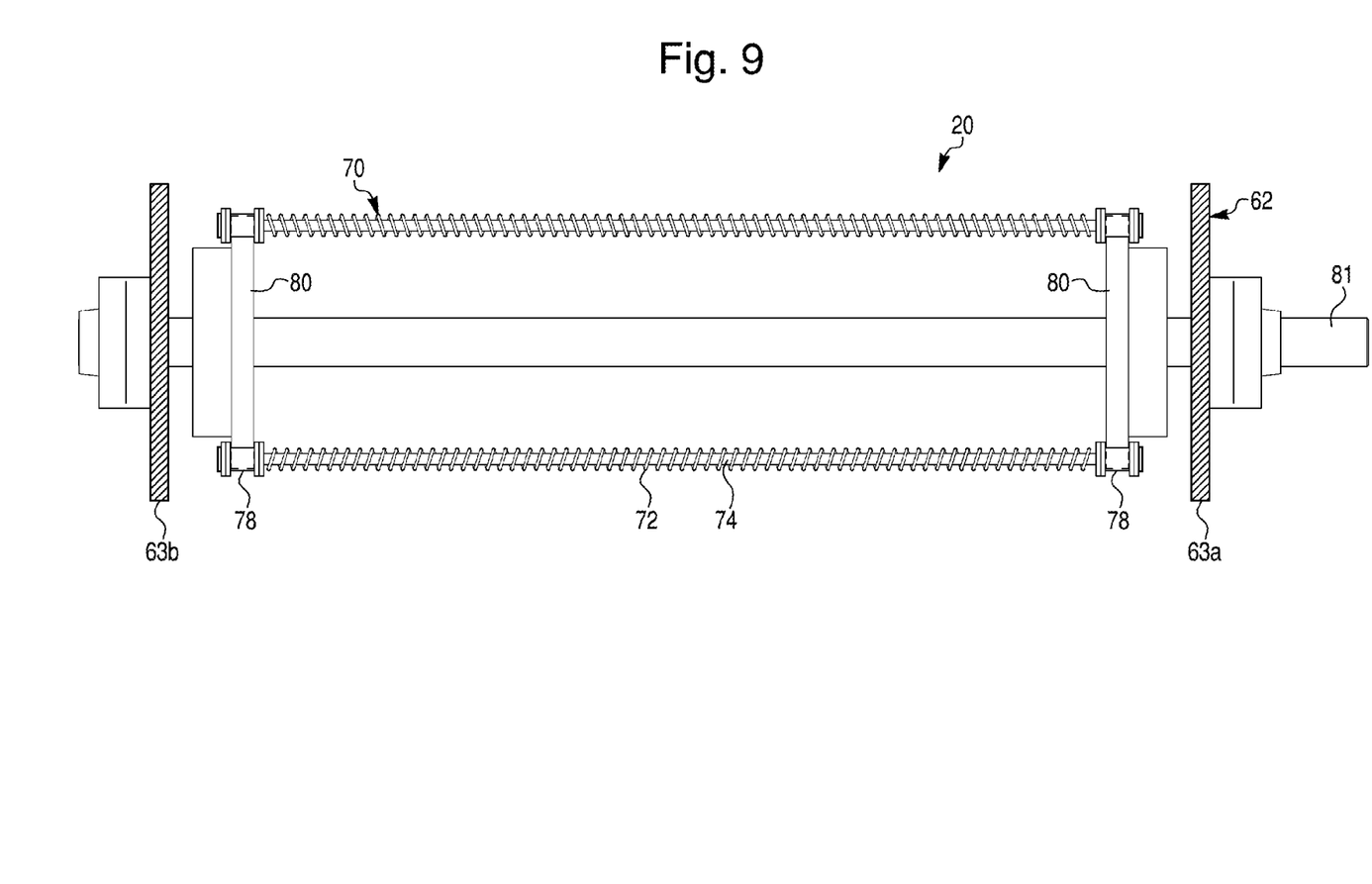
FIG. 9 is a vertical cross-sectional view of the screening device according to the exemplary embodiment of the present invention taken along the lines 9-9 in FIG. 6A.
Figure 10:
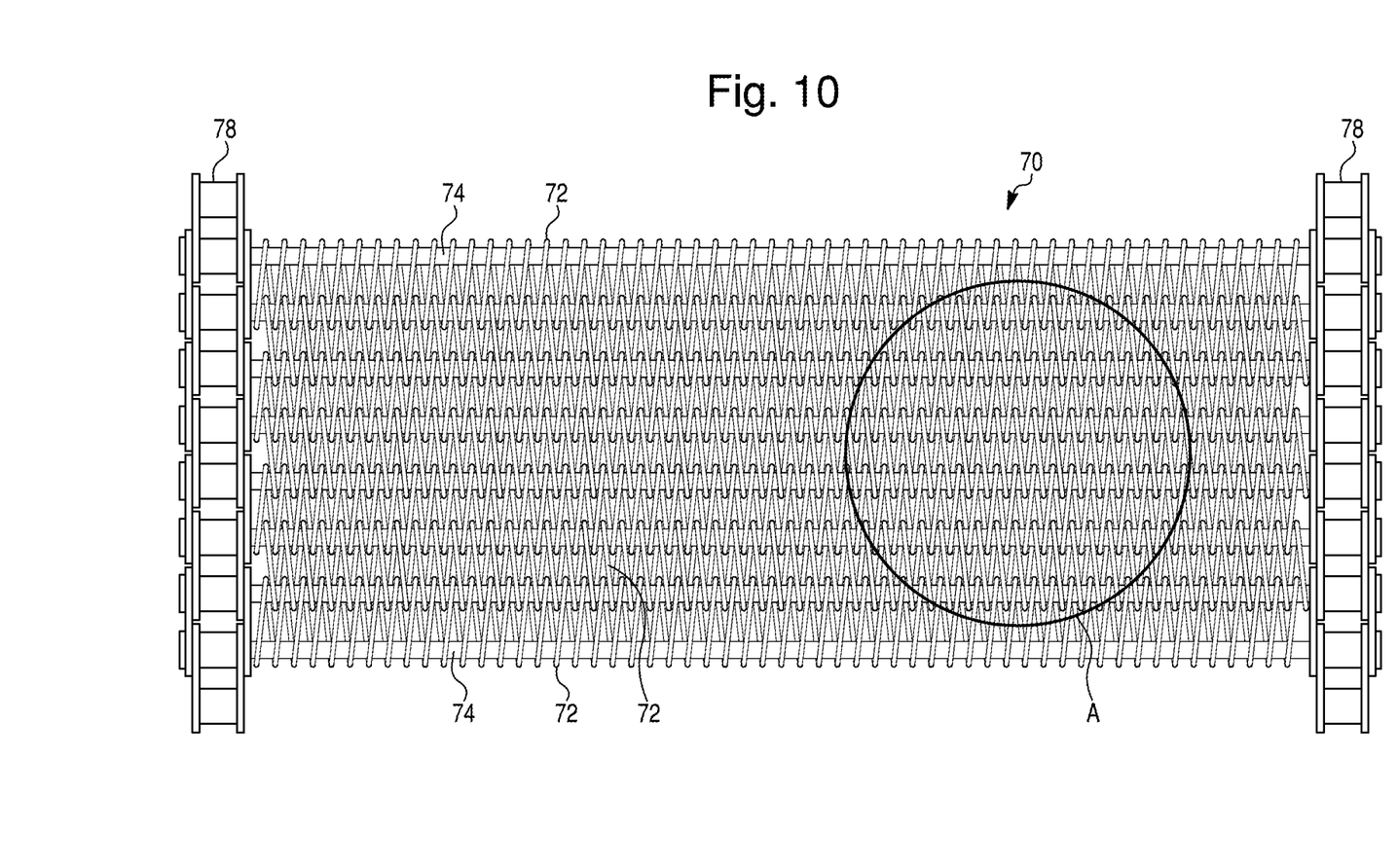
FIG. 10 is an enlarged plan view of a fragment of an endless flexible screen belt of the screening device of FIG. 6A.
Figure 11:
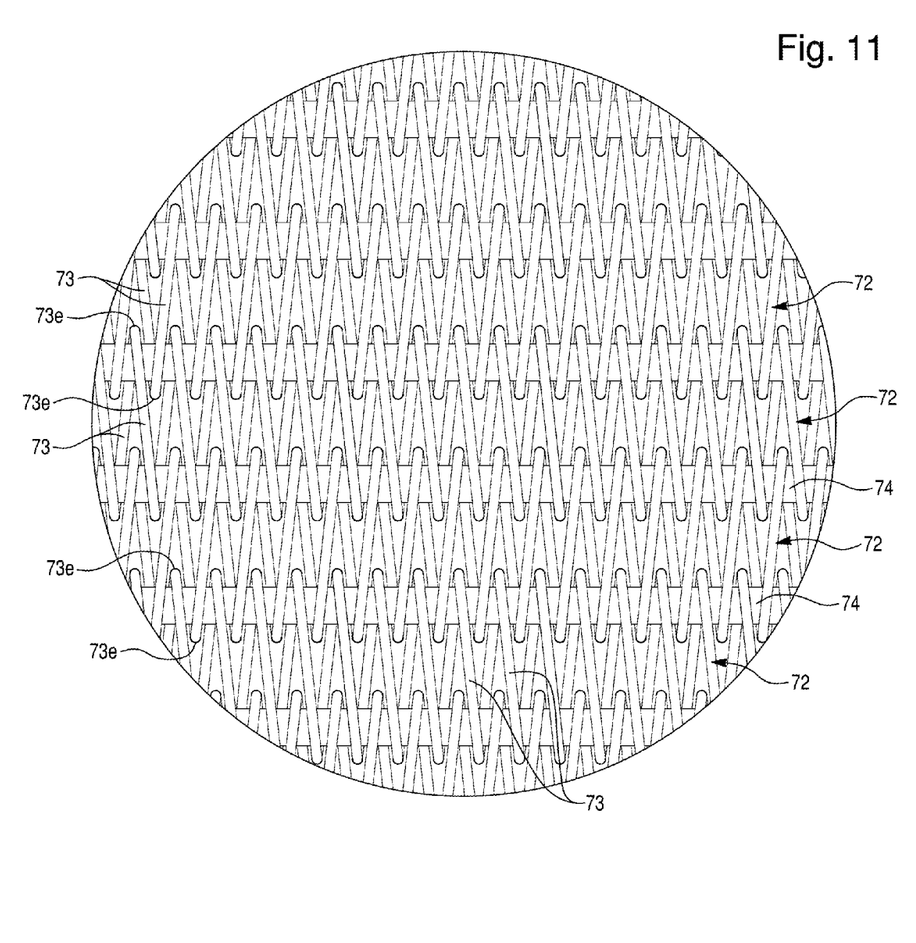
FIG. 11 is an enlarged plan view of a fragment of the endless flexible screen belt shown in circle "A" of FIG. 10.
Figure 12:
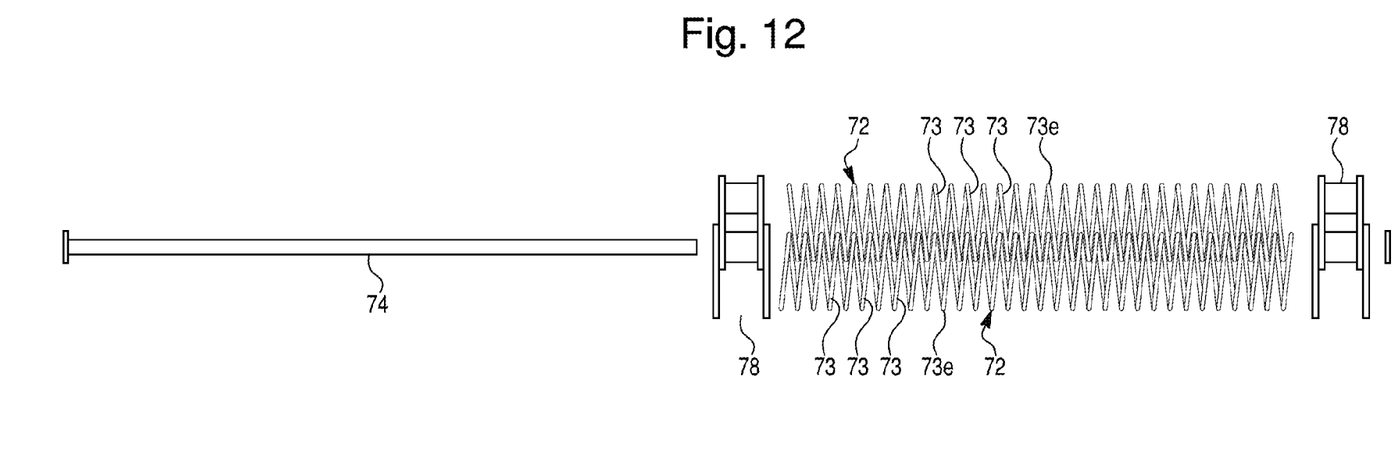
FIG. 12 is a partial exploded view of the endless flexible screen belt of FIG. 10.

As further illustrated in detail in FIGS. 5 and 7, the screening device 20 also includes drive and driven support rollers 86 and 88, respectively, coaxially arranged between the drive and driven sprockets 80 and 82, respectively, for supporting a central portion (in the direction of the transverse axis Y-Y) of the screen belt 70. Specifically, the drive support roller 86 is non-rotatably mounted to the drive shaft 81 so as to be rotatable relative to the support member 62 along with the drive sprockets 80, while the driven support roller 88 is non-rotatably mounted to the driven shaft 83 so as to be rotatable relative to the support member 62 along with the driven sprockets 82. Moreover, the support member 62 of the screening device 20 further includes support flanges 66 provided for supporting opposite transverse edges of the screen belt 70.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in fight of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method of screening for separating and reclaiming abrasive blasting material from contaminants, comprising the steps of:
   providing a support member having a longitudinal axis and a transverse axis; and
   providing an endless flexible screen belt mounted to the support member and movable about an endless closed loop in the direction of the longitudinal axis;
   the screen belt having a plurality of openings, the screen openings being sized to allow articles of abrasive blasting material of a desired size to fall therethrough by gravity and to prevent contaminants larger than the abrasive blasting material from falling therethrough by gravity;
   providing a drive mechanism mounted to the support member for driving the screen belt along the endless closed loop; and
   depositing contaminated abrasive blasting material onto the screen belt and moving the screen belt in the direction of the longitudinal axis and allowing abrasive blasting material to fall through the screen belt while allowing contaminants to be transported along the screen belt;
   the drive mechanism comprising an endless flexible power transmitting member attached to the screen belt so that the movement of the endless flexible power transmitting member imparting the corresponding movement of the screen belt;
   the endless flexible power transmitting member being an endless flexible drive chain attached to said screen belt so that the movement of said drive chain imparting the corresponding movement of said screen belt.

2. The method as defined in claim 1, wherein the endless flexible drive chain extends in the direction of the longitudinal axis.

3. The method as defined in claim 1, wherein the drive mechanism further comprises at least one drive sprocket rotatably mounted to the support member and drivingly engaging the flexible drive chain.

4. The method as defined in claim 3, wherein the drive mechanism further comprises a motor provided for driving the at least one drive sprocket.

5. The method as defined in claim 1, wherein the screen belt is in the form of an endless flexible wire mesh belt.

6. The method as defined in claim 5, wherein the wire mesh belt comprises a plurality of interconnected spiral wire members extending in the direction of the transverse axis and arranged parallel to each another.

7. The method as defined in claim 6, wherein each of the spiral wire members has an oval configuration in the direction of the longitudinal axis.

8. A method of screening for separating and reclaiming abrasive blasting material from contaminants, comprising the steps of:
   providing a support member having a longitudinal axis and a transverse axis; and
   providing an endless flexible screen belt mounted to the support member and movable about an endless closed loop in the direction of the longitudinal axis;
   the screen belt having a plurality of openings, the screen openings being sized to allow articles of abrasive blastin material of a desired size to fall therethrough gravity and to prevent contaminants larger than the abrasive blasting material from falling therethrough by gravity; and
   depositing contaminated abrasive blasting material onto the screen belt and moving the screen belt in the direction of the longitudinal axis and allowing abrasive blasting material to fall through the screen belt while allowing contaminants to be transported along the screen belt;
   the screen belt being in the form of an endless flexible wire mesh belt comprising a plurality of interconnected spiral wire members extending in the direction of the transverse axis and arranged parallel to each another and a plurality of connecting rod members extending in the direction of the transverse axis and being spaced from one another in the direction of the longitudinal axis;
   each of the connecting rod members extending through two adjacent spiral wire members so as to interconnect the two adjacent spiral wire members; and
   open spaces formed in the spiral wire members between the spaced connecting rod members defining the screen openings of the screen belt.

9. A method of screening for separating and reclaiming abrasive blasting material from contaminants comprising the steps of:
   providing a support member having a longitudinal axis and a transverse axis; and
   providing an endless flexible screen belt mounted to the support member and movable about an endless closed loop in the direction of the longitudinal axis;
   the screen belt having a plurality of openings, the screen openings being sized to allow articles of abrasive blastin material of a desired size to fall therethrough gravity and to prevent contaminants larger than the abrasive blasting material from falling therethrough by gravity; and
   depositing contaminated abrasive blasting material onto the screen belt and moving the screen belt in the direction of the longitudinal axis and allowing abrasive blasting material to fall through the screen belt while allowing contaminants to be transported along the screen belt;
   providing a vacuum pump powered by a prime mover and a vacuum pick-up;
   the vacuum pick-up being fluidly connected to the vacuum pump to draw the contaminated abrasive blasting material into the vacuum pick-up.

10. The method as defined in claim 9, wherein the contaminated abrasive blasting material is deposited onto the endless flexible screen belt via the vacuum pick-up.

* * * * *